April 11, 1939.                F. W. LINDBLOM                2,154,382
                          SPECTACLE TEMPLE MOUNTING
                              Filed Nov. 26, 1937
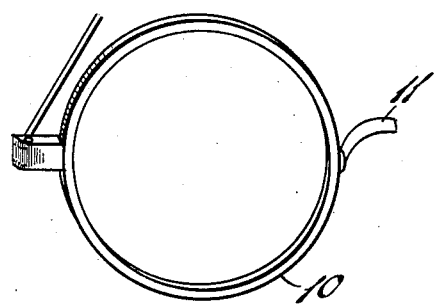
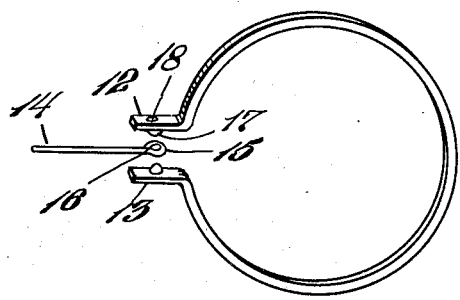
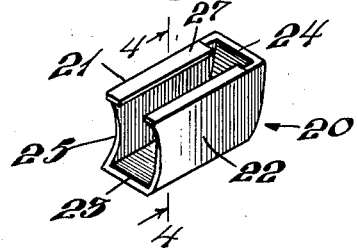
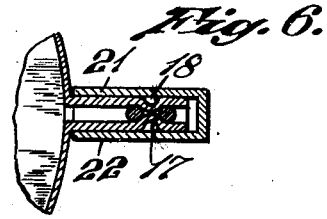
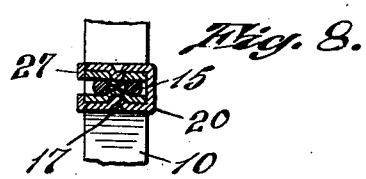
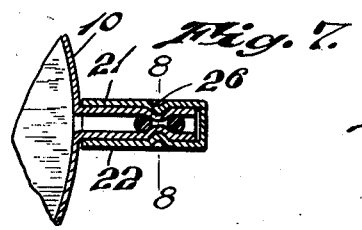
INVENTOR.
Frank W. Lindblom
BY Barlow & Barlow
ATTORNEYS.

Patented Apr. 11, 1939

2,154,382

UNITED STATES PATENT OFFICE 2,154,382

SPECTACLE TEMPLE MOUNTING

Frank W. Lindblom, Cranston, R. I., assignor to Welsh Manufacturing Company, a corporation of Rhode Island Application November 26, 1937, Serial No. 176,453

3 Claims. (Cl. 88—53)

This invention relates to a spectacle temple mounting, and is an improvement upon the structure shown in my co-pending application, Serial No. 74,297, filed April 14, 1936, and is designed to perform the same objects as those presented in this co-pending application above identified, and in addition thereto has additional objects one of which is the provision of a clip which will allow some resiliency or flexing of the rim for enlargement or contraction due to changes in temperature so as to prevent the breakage of lenses contained within the rim and secured by the clip.

Another object of the invention is to cause a holding between the clip and the lugs or end pieces of the rim at a point remote from the lens to leave considerable length of lugs or end pieces for flexing purposes.

Another object of the invention is the provision of a clip which may be held upon the lugs or end pieces of the rim by a mere indenting of the parts.

Another object is the provision of an arrangement by which the size of the encircling rim may be changed.

With these and other objects in view, the invention consists of certain novel features of construction, as will be more fully described, and particularly pointed out in the appended claims.

In the accompanying drawing:

Fig. 1 is a perspective view of a portion of a spectacle showing fragmentally the bridge and a complete rim with fragmental portion of a temple attached thereto, and illustrating my clip as in assembled position thereon;

Fig. 2 is also a perspective view showing the rim before being completely assembled with the temple;

Fig. 3 is a perspective view of the clip for receiving and holding the lugs of the rim in assembled position;

Fig. 4 is a sectional view on line 4—4 of Fig. 3 of the clip;

Fig. 5 is a fragmental perspective view of the lug and adjoining portion of the lens rim;

Fig. 6 is a sectional view through the lugs and clip, showing the temple in assembled position, but before securing the clip to the lugs;

Fig. 7 is a view similar to Fig. 6 after the clip has been secured to the lugs;

Fig. 8 is a sectional view on line 8—8 of Fig. 7.

In mounting lenses in spectacle rims in accordance with the manner as shown in the above-mentioned application, it was found that because of clamping of the lugs of the rim closely adjacent to the rim, that breakage would occur of the lenses after they had been assembled due to changes in temperature of the room or place of storage; and in order to remedy this occurrence I have provided the lens rims, at the outer extremity of the horizontal axis of the lens, with outwardly extending terminal lugs or end pieces of a resilient character to allow for the expansion of the lens, these lugs adapted to be free adjacent the lens when such changes occur, while the clip which holds these lugs in assembled relation is so constructed that it will provide for such changing positions of the lugs due to changes in temperature; and the following is a more detailed description of the present embodiment of this invention, illustrating the preferred means by which these advantageous results may be accomplished:

With reference to the drawing, 10 designates one of the lens rims and 11 a bridge which attaches the lens rims together. The lens rim is provided with outwardly extending terminal lugs or end pieces 12 and 13 which are so located as to provide a convenient attachment for the temples which form a part of the spectacles. One of the temples 14 is illustrated as being bent at its end into the form of an eye 15 having an opening 16 therein and each of the lugs or end pieces 12 and 13 are depressed or deflected so as to provide a projection 17 on each of the surfaces toward each other and a depression 18 on the outer surfaces away from each other. These projections 17 each extend into the opening 16 of the eye 15 so as to provide a pivotal mounting of the temple 14 therewith, and by reason of holding the lugs snugly in engagement with the temple friction occurs between the temple and the lugs to hold the temple in different adjusted positions, such for instance as in folded relation.

The lugs 12 and 13 are held in this assembled relation by reason of a clip or housing designated 20, which has top and bottom walls 21 and 22 held together by a front wall 23 and provided with an end wall 24, the top and bottom walls being provided with lips 27 to assist in the housing of the portions which the clip embraces. The walls 21 and 22 are normally tapered inwardly somewhat so that they must be spread or sprung apart to receive the assembly of the lugs 12 and 13 and the temple 14, and these walls will firmly press against the lugs 12 and 13 so as to resiliently hold this assembly in firm frictional relationship.

The top and bottom walls 21 and 22 are recessed as at 25 so as to receive the rims and fit snugly thereabout, and in order to maintain these parts in assembled relation the clip is indented or deflected as at 26 so as to extend into the recesses 18 which affords a holding of the parts at a considerable distance from the rim 10 and provides for flexure of the lugs between the rim and the point of holding to the pivotal connection of the temple so that changes of size due to temperature will be accommodated and the walls 21 and 22 as well as the lugs may expand and contract.

By reason of this long relatively free portion of these lugs also they may be bent inwardly somewhat for the accommodation of smaller lenses and a greater adjustment of size provided.

The foregoing description is directed solely towards the construction illustrated, but I desire it to be understood that I reserve the privilege of resorting to all the mechanical changes to which the device is susceptible, the invention being defined and limited only by the terms of the appended claims.

I claim:

1. In a spectacle, a rim having outwardly extending lugs, cooperating means on the lugs for pivotally mounting a temple between the lugs, said lugs being maintained in spaced relation throughout their length by said temple when the lugs are embraced by a clip in the closed position of said rim, a resilient clip for holding the lugs in desired relation, and means on the clip remote from the rim adapted to co-act with said pivot means on the lugs for maintaining the clip in assembled relation with the lugs.

2. In a spectacle, a rim having outwardly extending lugs, indented means on one of the lugs providing a recess in the outer surface and a projection on the inner surface, said projection extending into and pivotally mounting a temple between the lugs, said lugs being maintained in spaced relation throughout their length by said temple when the lugs are embraced by a clip in the closed position of said rim, a resilient clip embracing said lugs for holding them in desired relation, said clip having a portion deflected into said recess to hold the clip in assembled relation on the lugs.

3. In a spectacle, a rim having outwardly extending lugs, indented means on the lugs in opposed relation thereon providing recesses on the outer surfaces and projections on the inner surfaces for pivotally mounting a temple between the lugs, said lugs being maintained in spaced relation throughout their length by said temple when the lugs are embraced by a clip in the closed position of said rim, a resilient clip embracing said lugs for holding them in desired relation, said clip having portions deflected into said recesses to hold the clip in assembled relation on the lugs.

FRANK W. LINDBLOM.